United States Patent [19]

Ueda et al.

[11] Patent Number: 4,808,014

[45] Date of Patent: Feb. 28, 1989

[54] ATTACHING STRUCTURE FOR CERAMICS BEARING

[75] Inventors: Kouichi Ueda; Kouichi Yamauchi; Hiroaki Takebayashi; Kazuo Rokkaku, all of Osaka, Japan

[73] Assignee: Koyo Seiko Co., Ltd., Osaka, Japan

[21] Appl. No.: 110,909

[22] Filed: Oct. 21, 1987

[30] Foreign Application Priority Data

Oct. 24, 1986 [JP] Japan ................................ 61-254157

[51] Int. Cl.⁴ ........................ F16C 33/62; F16C 33/58
[52] U.S. Cl. .................................... 384/492; 384/510; 384/907.1
[58] Field of Search ............... 384/492, 491, 510, 513, 384/569, 615, 622, 627, 907, 907.1, 910, 913

[56] References Cited

U.S. PATENT DOCUMENTS

| | | | |
|---|---|---|---|
| 3,097,897 | 7/1963 | Taylor | 384/492 |
| 3,178,241 | 4/1965 | Braunagel | 384/907 X |
| 4,634,300 | 1/1987 | Takebayashi et al. | 384/492 X |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

A structure of attaching to a metal shaft a ceramics bearing which comprises an inner ring, an outer ring and rolling members and in which at least the inner ring is made of ceramics. The inner ring is made of silicon nitride or sialon molded by the hot press sintering process or the hot isostatic press sintering process. The shaft is press-fitted in the inner ring with an interference of not greater than a specified value.

3 Claims, No Drawings

ATTACHING STRUCTURE FOR CERAMICS BEARING

BACKGROUND OF THE INVENTION

The present invention relates to an attaching structure for a ceramics bearing, and more particularly to a structure for attaching to a metal shaft a ceramics bearing which comprises an inner ring, an outer ring and rolling members and in which at least the inner ring is made of ceramics.

Since ceramics are higher than metals in high-temperature strength, roller bearings for use at high temperatures include ceramics bearings comprising an inner ring, an outer ring and rolling members which are all made of ceramics. However, the use of such ceramics bearings involves the following problem because the shaft to which the inner ring is attached is made of metal. Metals are greater than ceramics in coefficient of thermal expansion, and the difference increases with an increase in temperature. Accordingly, if there is no clearance between the metal shaft and the ceramics inner ring at room temperature, a negative clearance occurs therebetween at the operating temperature, with the result that the inner ring is subjected to a tensile stress. Generally, ceramics are not resistant to tension, and the inner ring is likely to break under tension, so that the occurrence of such a negative clearance is considered undesirable. For this reason, it is practice to provide a positive clearance between the shaft and the inner ring at room temperature to preclude the occurrence of a negative clearance at the operation temperature. Nevertheless, the positive clearance causes objectionable creep between the shaft and the inner ring. It is also proposed to provide between the metal shaft and the ceramics inner ring a member for absorbing the difference in thermal expansion between the two materials (Operation of an All-Ceramic Mainshaft Roller Bearing in a J-402 Gas-Turbine Engine, C 324C, Prepr. Presented ASLE Annu. Meet. (Am. Soc. Lubr. Eng.) (U.S.A.) 35th 3C. 1-3C. 7('80)). However, the member, when used, renders the assembly complex in structure and difficult to handle.

SUMMARY OF THE INVENTION

The main object of the present invention is to provide a structure for attaching a ceramics bearing to a shaft which is adapted to preclude creep due to a clearance between the shaft and the inner ring and to prevent the inner ring from breaking due to the difference in coefficient of thermal expansion therebetween. p We have conducted research on fits between ceramics inner rings and metal shafts and found that when the inner ring is made of silicon nitride or sialon (trade name of Lucas in England) molded by the hot press sintering process or the hot isostatic press sintering process, the inner ring does not break even when a metal shaft is fitted therein with an interference resulting in a circumferential stress of up to a specified value. Thus, the present invention has been accomplished.

More specifically, the structure of the present invention for attaching a ceramics bearing to a metal shaft is characterized in that the inner ring of the bearing is made of silicon nitride or sialon molded by the hot press sintering process or the hot isostatic press sintering process, the shaft being press-fitted in the inner ring with an interference of not greater than a specified value.

The maximum value of interference between the inner ring and the shaft is so determined that the inner ring is subjected to a circumferential stress of not greater than a specified value. In the case where the inner ring is made of silicon nitride molded by the hot press sintering process or the hot isostatic press sintering process, the maximum value of interference is so determined that the circumferential stress will be, for example, not greater than 20 kgf/mm$^2$. The interference between the inner ring and the shaft, when within this range, does not fracture the inner ring.

According to the present invention, the shaft is press-fitted in the inner ring with an interference, so that there is no likelihood of creep occurring therebetween. Even when given an interference of up to the specified value, the inner ring is operable free of breaking since the ring is made of silicon nitride or sialon which is molded by the hot press sintering process or the hot isostatic press sintering process.

DESCRIPTION OF THE PREFERRED EMBODIMENT

To substantiate the above advantage, an example of the invention is given below.

First, test pieces, i.e. inner rings of silicon nitride and shafts of stainless steel, having the properties listed in Table 1 were prepared. Further a bore was formed in the shaft coaxially therewith for inserting a heater thereinto. The inner ring was 38.5 mm in outside diameter (O.D.) and 30 mm in inside diameter (i.D.). The shaft was 30 mm in outside diameter (O.D.) and 10 mm in the diameter of the bore.

TABLE 1

| | Material | Coefficient of expansion (1/°C.) | Modulus of* elasticity (kgf/mm$^2$) | Poisson's ratio |
|---|---|---|---|---|
| Inner** ring | silicon nitride | 3.2 × 10$^6$ | 3.2 × 10$^4$ | 0.26 |
| Shaft | SUS303 | 17.2 × 10$^6$ | 1.97 × 10$^4$ | 0.3 |

Note:
*Modulus of longitudinal elasticity.
**Prepared by the hot press sintering process.

Next, the inner ring was fitted around the bored portion of the shaft, the heater was inserted into the bore in the shaft, and the assembly was heated. At the same time, the temperature of the outer surface of the shaft and the outer surface of the ring was measured by a thermocouple, while the outside diameter of the shaft and the outside diameter of the inner ring were measured by a laser measuring instrument. Before the shaft was inserted through the inner ring, the inside diameter of the inner ring was measured at varying temperatures by the instrument. The interference between the shaft and the inner ring was calculated from the measurements concerned. In determining the interference, the temperature of the inner surface of the inner ring was considered to be equal to that of the outer surface of the shaft. The rate of heating was so controlled that the shaft had the same outside diameter and the same temperature at the opposite sides of the inner ring. The test was conducted while rendering the outer periphery of the inner ring free of any restraint as by a ring.

Table 2 and Table 3 show the test results achieved by two inner rings No. 1 and No. 2, respectively.

TABLE 2

| Shaft | | Inner ring | | | Clearance |
|---|---|---|---|---|---|
| O.D. (1) (mm) | Temp. (°C.) | O.D. (mm) | I.D. (2) (mm) | Temp. (°C.) | (1)–(2) (μm) |
| 29.989 | 20 | 38.489 | 29.999 | 20 | −10 |
| 30.000 | 41 | 38.491 | 30.001 | 40 | −1 |
| 30.006 | 53 | 38.493 | 30.002 | 51 | 4 |
| 30.015 | 71 | 38.495 | 30.004 | 68 | 11 |
| 30.024 | 88 | 38.497 | 30.005 | 84 | 19 |
| 30.032 | 103 | 38.498 | 30.006 | 95 | 26 |
| 30.041 | 120 | 38.500 | 30.008 | 110 | 33 |

TABLE 3

| Shaft | | Inner ring | | | Clearance |
|---|---|---|---|---|---|
| O.D. (1) (mm) | Temp. (°C.) | O.D. (mm) | I.D. (2) (mm) | Temp. (°C.) | (1)–(2) (μm) |
| 29.989 | 20 | 38.503 | 29.993 | 20 | −4 |
| 30.001 | 43 | 38.506 | 29.995 | 42 | 6 |
| 30.013 | 67 | 38.509 | 29.997 | 65 | 16 |
| 30.017 | 75 | 38.509 | 29.998 | 72 | 19 |
| (30.039) | 117 | Fractured | | 109 | (37) |

The measurements given in Tables 2 and 3 are arranged downward with the lapse of time. The results indicate that with a rise of temperature due to heating, the interference increases owing to the difference between stainless steel and ceramics.

The inner ring No. 1 remained free of fracture until the interference increased to 33 μm.

The inner ring No. 2 fractured when the interference increased to 37 μm.

The pressure P acting on the fitting surfaces of the inner ring and the shaft and the maximum circumferential stress ρ of the inner ring due to fitting are expressed as follows according to the fitting calculation equation for roller bearings.

$$P = \Delta\text{eff} \left[ \frac{d}{EB} \left( \frac{Di^2 + d^2}{Di^2 - d^2} \right) + \nu B \right) + \frac{d}{ES} \left( \frac{d^2 + do^2}{d^2 - do^2} - \nu S \right) \right]^{-1} \quad (1)$$

$$\sigma = p \cdot \frac{Di^2 + d^2}{Di^2 - d^2} \quad (2)$$

where
 d: inside diameter of inner ring
 Di: outside diameter of outer ring
 Δeff: effective interference of inner ring
 do: inside diameter of shaft
 EB: modulus of longitudinal elasticity of ceramics
 νB: Poisson's ratio of ceramics
 ES: modulus of longitudinal elasticity of SUS303
 νS: Poisson's ratio of SUS303

Equations (1) and (2) give the following P and ρ values for the inner ring No. 1 when the interference is 33 μm.

P=5.6 kgf/mm$^2$
ρ=22.9 kgf/mm$^2$

Accordingly, the inner ring No. 1 did not fracture when the circumferential stress was 22.9 kgf/mm$^2$.

P and ρ similarly calculated for the inner ring No. 2 when the interference is 33 μm are:

P=6.33 kgf/mm$^2$
ρ=25.9 kgf/mm$^2$

This indicates that the inner ring No. 2 fractured when the circumferential stress became 25.9 kgf/mm$^2$.

These results indicate that when the maximum value of the interference between the ring and the shaft is so determined that the resulting circumferential stress will be, for example, up to 20 kgf/mm$^2$, interferences within this range do not fracture the inner ring.

What is claimed is:

1. A rotary member supporting apparatus comprising an inner ring, an outer ring, a plurality of rollers held between said inner and outer rings, and a shaft being press-fitted within said inner ring, at least said inner ring being made of ceramics molded by a hot press sintering process or a hot isostatic press sintering process, wherein an interference is previously formed between said shaft and said inner ring prior to press-fitting thereof in a manner such that a circumferential stress is produced therebetween without causing failure thereof, said circumferential stress being not greater than 20 Kgf/mm$^2$.

2. A rotary member supporting apparatus according to claim 1, wherein said inner ring is made of silicon nitride.

3. A rotary member supporting apparatus according to claim 1, wherein said inner ring is made of sialon.

* * * * *